US012762093B2

(12) United States Patent
Xu et al.

(10) Patent No.: US 12,762,093 B2
(45) Date of Patent: Oct. 13, 2026

(54) DATA STORAGE METHOD AND APPARATUS, DEVICE, MEDIUM AND STORAGE CLUSTER

(71) Applicant: Suzhou MetaBrain Intelligent Technology Co., Ltd., Suzhou (CN)

(72) Inventors: Hongzhi Xu, Suzhou (CN); Shansong Yang, Suzhou (CN); Jiande Rui, Suzhou (CN); Yanqing Wang, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 19/116,293

(22) PCT Filed: Sep. 12, 2024

(86) PCT No.: PCT/CN2024/118604
§ 371 (c)(1),
(2) Date: Mar. 27, 2025

(87) PCT Pub. No.: WO2025/055996
PCT Pub. Date: Mar. 20, 2025

(65) Prior Publication Data

US 2025/0258801 A1 Aug. 14, 2025

(30) Foreign Application Priority Data

Sep. 12, 2023 (CN) ......................... 202311167630.3

(51) Int. Cl.
*G06F 16/21* (2019.01)

(52) U.S. Cl.
CPC .................................... *G06F 16/21* (2019.01)

(58) Field of Classification Search
CPC ....... G06F 16/21; G06F 16/22; G06F 16/2228
See application file for complete search history.

(56) References Cited

U.S. PATENT DOCUMENTS

2010/0153613 A1* 6/2010 Zwisler .................... G06F 3/061
710/313
2013/0326494 A1* 12/2013 Nunez .................... H04L 41/082
717/172

(Continued)

FOREIGN PATENT DOCUMENTS

CN 109857335 A 6/2019
CN 111258497 A 6/2020

(Continued)

OTHER PUBLICATIONS

International Search Report of corresponding PCT application (PCT/CN2024/118604) Dec. 26, 2024.

(Continued)

*Primary Examiner* — Amy Ng
*Assistant Examiner* — Dustin D Eyers
(74) *Attorney, Agent, or Firm* — Cooper Legal Group, LLC

(57) ABSTRACT

The embodiments of the present application disclose a data storage method and apparatus, a device, a medium and a storage cluster, which relate to the field of storage technologies and can meet a data storage requirement for nodes in the storage cluster. The method includes the following steps: accessing an internal volume of the storage cluster, and writing its own target data into the internal volume for storage, wherein the internal volume is created through the following step: creating the internal volume on the basis of a plurality of storage class memory disks configured for the storage cluster, wherein the internal volume is configured to store respective target data of each node in the storage cluster.

7 Claims, 5 Drawing Sheets

(56) References Cited

U.S. PATENT DOCUMENTS

| | | | | |
|---|---|---|---|---|
| 2013/0332484 | A1* | 12/2013 | Gajic | G06F 16/285 707/E17.014 |
| 2019/0095494 | A1* | 3/2019 | Bhattacharjee | G06F 16/24554 |
| 2019/0286839 | A1* | 9/2019 | Mutha | G06F 21/604 |
| 2020/0311045 | A1* | 10/2020 | Park | G06F 16/2365 |
| 2022/0236879 | A1* | 7/2022 | Tsuchiya | G06F 3/0617 |

FOREIGN PATENT DOCUMENTS

| | | | |
|---|---|---|---|
| CN | 111309255 | A | 6/2020 |
| CN | 116339609 | A | 6/2023 |
| CN | 116909491 | A | 10/2023 |

OTHER PUBLICATIONS

Written Opinion of International Searching Authority of corresponding PCT application (PCT/CN2024/118604) Dec. 26, 2024.
First Office Action of corresponding CN priority application (CN202311167630.3)Oct. 25, 2023.
Notification to Grant Patent Right for Invention of corresponding CN priority application (CN202311167630.3) Nov. 11, 2023.

* cited by examiner

DATA STORAGE METHOD AND APPARATUS, DEVICE, MEDIUM AND STORAGE CLUSTER

CROSS-REFERENCE TO RELATED APPLICATION

This application claims priority to Chinese Patent Application No. 202311167630.3, filed on Sep. 12, 2023 in China National Intellectual Property Administration and entitled "Data Storage Method and Apparatus, Device, Medium and Storage Cluster", which is incorporated herein by reference in its entirety.

FIELD

The present application relates to the field of storage technologies, and more particularly, to a data storage method and apparatus, a device, a medium and a storage cluster.

BACKGROUND

Nodes in a storage cluster need to open up a large memory to store their own performance monitoring data or metadata and other large volume data, but due to limited memory resources, it is usually impossible to allocate enough memory to meet a data storage requirement for the nodes.

SUMMARY

In a first aspect, an embodiment of the present application provides a data storage method, which is applied to any node in a storage cluster. The method includes:

accessing an internal volume of the storage cluster, and writing its own target data into the internal volume for storage, wherein the internal volume is created through the following step:

creating the internal volume on the basis of a plurality of storage class memory disks configured for the storage cluster, wherein the internal volume is configured to store the target data of each node in the storage cluster.

In a second aspect, an embodiment of the present application further provides a data storage method, which is applied to a memory database configured for a storage cluster. The method includes:

in response to receiving a write instruction from nodes in the storage cluster, directly writing target data to be written corresponding to the write instruction into a database table corresponding to the nodes in a persistent storage region of the memory database for storage, wherein the persistent storage region of the memory database includes an internal volume of the storage cluster created on the basis of a plurality of storage class memory disks configured for the storage cluster.

In a third aspect, an embodiment of the present application further provides a storage cluster. The storage cluster includes a plurality of nodes, wherein:

a target node among the plurality of nodes is configured to create an internal volume of the storage cluster on the basis of a plurality of storage class memory disks configured for the storage cluster; and each of the plurality of nodes is configured to access the internal volume of the storage cluster, and write its own target data into the internal volume for storage.

In a fourth aspect, an embodiment of the present application further provides a data storage apparatus, which is applied to any node in a storage cluster. The apparatus includes:

a first writing module, configured to access an internal volume of the storage cluster, and write its own target data into the internal volume for storage; and an internal volume creation module, configured to create the internal volume on the basis of a plurality of storage class memory disks configured for the storage cluster, wherein the internal volume is configured to store the target data of each node in the storage cluster.

In a fifth aspect, an embodiment of the present application provides a data storage apparatus, which is applied to a memory database configured for a storage cluster. The apparatus includes:

a first response module, configured to, in response to receiving a write instruction from nodes in the storage cluster, directly write target data to be written corresponding to the write instruction into a database table corresponding to the nodes in a persistent storage region of the memory database for storage, wherein the persistent storage region of the memory database includes an internal volume of the storage cluster created on the basis of a plurality of storage class memory disks configured for the storage cluster.

In a sixth aspect, an embodiment of the present application further provides an electronic device. The electronic device includes a memory, a processor, and computer-readable instructions that are stored in the memory, wherein the processor is configured to execute the computer-readable instructions to implement the data storage method according to the first aspect or the second aspect.

In a seventh aspect, an embodiment of the present application further provides one or more non-volatile computer-readable storage media having computer-readable instructions stored therein, wherein the computer-readable instructions, when being executed by one or more processors, implement the data storage method according to the first aspect or the second aspect.

In an eighth aspect, an embodiment of the present application provides a computer-readable instruction product. The computer-readable instruction product includes computer-readable instructions, wherein the computer-readable instructions, when being executed by a processor, implement the data storage method according to the first aspect or the second aspect.

BRIEF DESCRIPTION OF THE DRAWINGS

To describe the embodiments of the present application more clearly, the following briefly introduces the accompanying drawings required for describing the embodiments. Apparently, the accompanying drawings in the following description show only some embodiments of the present application, and a person of ordinary skill in the art may still derive other drawings from these accompanying drawings without creative efforts.

DETAILED DESCRIPTION

Figure 1:
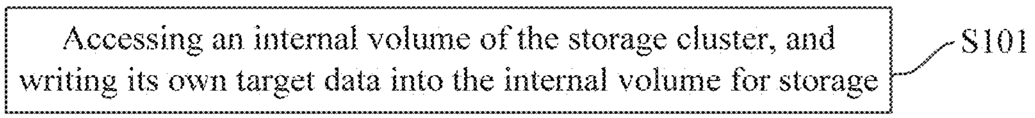
FIG. 1 is an implementation flowchart of a data storage method provided by one or more embodiments of the present application.

The technical solutions in the embodiments of the present application will be described clearly and completely below in conjunction with accompanying drawings in the embodiments of the present application. Of course, the described embodiments are merely some embodiments, rather than all embodiments, of the present application. Based on the embodiments in the present application, all other embodiments derived by a person of ordinary skill in the art without creative efforts shall fall within the protection scope of the present application.

The terms "including" and "having" and any variations thereof in the specification, claims and the above drawings are intended to override non-exclusive inclusions. For example, a process, method, system, product or device including a series of steps or units is not limited to the listed steps or units, but may include steps or units not listed.

First, in order to facilitate the understanding of a data storage scheme in the embodiments of the present application, the following contents are introduced.

1. Storage Class Memory (SCM) Medium (i.e., SCM Disk)

The SCM medium, also known as a persistent memory (PM) medium or non-volatile memory (NVM), is a very popular new form of media in the industry, with the characteristics of persistence and fast byte-level access.

2. Dynamic Random Access Memory (DRAM)

DRAM is the most common system memory and can only retain data for a short period of time. In order to retain data, DRAM must be refreshed at regular intervals due to the use of capacitive storage, and if it is not refreshed, the stored information will be lost.

3. Memory Database

The memory database is a database that puts data in a memory for direct operation, and saves the data in the memory by using two characteristics that the read-write speed of the memory is faster than a disk and the memory is randomly accessible while the disk is sequentially accessible. A table structure and an index structure are imitatively established in the memory, and optimized for memory characteristics, making the memory database faster than traditional databases accessed from the disk.

4. Remote Dictionary Server (Redis)

Redis is an open-source, web-enabled, memory-based, and persistent log-based key-value database written in a standard C (ANSI C) language, and provides an application programming interface (API) in a plurality of languages. Like a distributed caching system (memcached), Redis data is cached in the memory to ensure the efficiency. The difference is that Redis periodically writes updated data to a disk or writes a modification operation to an appended record file, and implements master-slave synchronization on this basis. Redis can be persisted in the following two ways:

1) Persistence of a remote dictionary service database (RDB):

RDB writes a dataset snapshot in the memory to a disk within a specified time interval, and reads a snapshot file directly to the memory in the event of resuming. The dataset snapshot may be understood as taking a picture of a dataset at a certain point in time and saving this picture. In this way, Redis may save a data storage backup in the current system at a specified time interval or when a specific command is executed, and write this backup to a disk in a binary form.

2) Append only-file (AOF) persistence: AOF records all commands executed (except for a read operation), and re-execute them once when resuming; and if these commands are big data, they will take a long time to write, and AOF defaults to append files infinitely, so the size will continue to expand.

In related technologies, nodes in a storage cluster need to open up a large memory to store their own performance monitoring data or metadata (used to record the task execution of the nodes themselves) and other large volume data, but due to limited memory resources, it is usually impossible to allocate enough memory to meet a data storage requirement for the nodes.

Taking the performance monitoring data as an example, various performance indicators of the current storage device can be understood by viewing the performance monitoring data to help users understand a running status of the storage device, and help storage vendor's service personnel quickly locate problems. The storage device is generally dual- or multi-control. Performance monitoring may involve the storage and summarized display of performance data of each storage device node, the user's requirements for the duration of performance monitoring may be as long as several years, and the number of objects and object indicators required to be monitored are also very large.

For example, common monitoring objects include storage arrays, controllers, back-end statistics analysis system (SAS) ports, back-end Ethernet ports, front-end FC ports, front-end Ethernet ports, storage pools, hard disks, host groups, logical unit number (LUN) groups, LUNs, file systems, etc. Taking LUN as an example, most vendors can support several thousand LUNs, and some vendors can even support LUNs up to 65,535. Still taking LUN as an example, indicators of the monitoring objects usually include: the number of read-write operations per second (input/output operations per second, IOPS), read IOPS, write IOPS, average read-write (input/output, I/O) response time, average read I/O response time, average write I/O response time, block bandwidth, read bandwidth, write bandwidth, queue length, average read I/O size, average write I/O size, average I/O size of read cache hit ratio and write cache hit ratio, percentage of read I/O to total I/O, percentage of write I/O to total I/O, etc.

Due to the long performance monitoring time required by users (which may be up to several years), the number of monitoring objects (the number of some objects may be tens of thousands, such as the number of volumes) and the excessive number of monitoring indicators (for example, the volumes have nearly 20 indicators to monitor), each node needs to open up a large memory to store the performance monitoring data generated by a performance monitoring module in the node. However, the memory resources are limited, and in most cases, the performance monitoring module cannot allocate enough memory to meet the storage requirement for performance monitoring data, resulting in the decrease of the number of monitoring objects and indicators of the monitoring module, which cannot meet the needs of users.

In view of the problems existing in the above-mentioned related technologies, the present application proposes a data storage scheme, in which an internal volume is created by using a lower-cost SCM disk to store a large amount of target data of each node instead the memory, and accordingly, the data storage requirement of the nodes can be satisfied and the persistent storage of the target data can be achieved, thereby reducing the loss of the target data.

A data storage method and apparatus, a device, a medium and a storage cluster provided by the embodiments of the present application are described in detail below in conjunction with the accompanying drawings, through some embodiments and their application scenarios.

In a first aspect, referring to FIG. 1, FIG. 1 is an implementation flowchart of a data storage method provided by an embodiment of the present application. This data storage method may be applied to any node in a storage cluster. This method may include the following step:

step S101: accessing an internal volume of the storage cluster, and writing its own target data into the internal volume for storage.

The internal volume is created through the following step:

creating the internal volume on the basis of a plurality of storage class memory disks configured for the storage cluster, wherein the internal volume is configured to store the target data of each node in the storage cluster.

During specific implementation, any node in the storage cluster accesses the internal volume of the storage cluster while generating target data, and write the target data generated by this node into this internal volume; and the target data is persistently stored by the internal volume (i.e., internal LUN). Compared with the way of opening up the memory to achieve storage, a space to which the internal volume belongs comes from an SCM disk, and accordingly, the unit cost of the internal volume is much lower than that of the memory. Therefore, in the case of limited cost, a large internal volume, such as an internal volume of several hundred gigabytes (GB), may also be set to meet the storage requirement of each node in the storage cluster for the target data. In addition, the internal volume created on the basis of the SCM disk may store the target data for a long time, whereby the target data will not be lost due to a storage unit related to the node not being refreshed in time (for example, the node is offline and not refreshed in time), and the need for memory data to be further written to a hard disk (such as a system disk) to achieve a persistent storage operation can also be avoided, thereby improving the storage efficiency. The access delay of the SCM medium is generally less than 1 microsecond (μs), which is 2-3 orders of magnitude faster than the currently commonly used flash memory (NAND Flash). At the same time, the performance of the SCM medium in terms of longevity and data retention capability is far greater than that of NAND Flash, so a memory volume created on the basis of the SCM disk can achieve faster access speed, more stable data retention capability and longer service life than the hard disk or memory.

The user may configure a plurality of SCM disks for the storage cluster to create the internal volume according to a storage requirement for the current storage cluster, or configure a storage pool containing sufficient SCM disks for the storage cluster in advance. All or some of the SCM disks in the storage pool are selected to create the internal volume to meet different data storage requirements of the storage cluster. After the SCM disks have been configured for the storage cluster, a script may be set such that a target node (e.g., a master node or other specified nodes) in the storage cluster runs this script after the installation to automatically create the internal volume of the storage cluster on the basis of the SCM disks. After the internal volume has been created, each node of the storage cluster may write its own target data to the internal volume for persistent storage.

As can be seen from the above technical solutions, considering that the unit cost of the storage class memory disk is much lower than that of the memory, a plurality of storage class memory disks may be configured for the storage cluster; and the internal volume is created for the storage cluster according to the plurality of storage class memory disks to store a large amount of target data of each node instead the memory, and accordingly, the data storage requirement of the nodes can be satisfied and the persistent storage of the target data can be achieved, thereby reducing the loss of the target data.

Optionally, in one embodiment, the method further includes:

accessing the internal volume of the storage cluster, and reading the target data of one or more nodes in the storage cluster from the internal volume.

During specific implementation, the node may access the internal volume to read its own target data or read the target data of other nodes, whereby the occupancy of communication bandwidth to transmit the target data (e.g., metadata and performance monitoring data) between the nodes can be avoided. For example, the nodes of the traditional storage cluster need to communicate with each other to synchronize metadata in order to ensure that task execution-related information of this node is not lost after the node goes offline. However, in the embodiments of the present application, the internal volume is created to store the metadata of each node, whereby the node may directly acquire its own metadata from the internal volume after it is offline and resumed, so as to avoid the occupancy of the communication bandwidth owing to the transmission of the metadata between the nodes.

As a possible implementation, the target data includes performance monitoring data, and the node is a master node in the storage cluster or a new master node after the switching of master and slave nodes. The accessing the internal volume of the storage cluster and reading the target data of one or more nodes in the storage cluster from the internal volume include:

in response to receiving a target query request, reading the respective performance monitoring data of each node in the storage cluster from the internal volume.

This method further includes:

determining and returning a query result for the target query request according to the respective performance monitoring data of each node in the storage cluster.

It may be understood that considering that the traditional storage cluster may usually set a master node (i.e., a master controller) and one or more slave nodes (i.e., slave controllers) from each node, each node may open up a piece of memory to store its own performance monitoring data. In addition, the slave node periodically sends its own performance monitoring data to the master node, and the master node performs summarized calculation on the performance monitoring data of each node to obtain the performance monitoring data of the entire storage cluster, writes the performance monitoring data subjected to summarized calculation to the local system disk for persistent storage, and returns the performance monitoring data subjected to summarized calculation to the external as a query result in response to receiving an external target query request, wherein each node has its own memory and system disk (configured to store a system installation file).

However, since the slave node has to send its own performance monitoring data to the master node on a regular basis (the duration is short, 5 seconds in general cases), the nodes need to frequently send a huge amount of performance monitoring data, so the communication bandwidth between nodes is frequently occupied by the performance monitoring data, which affects the transmission of redundant mirror data such as caches between nodes, and ultimately affects the performance of the storage cluster.

Figure 2:
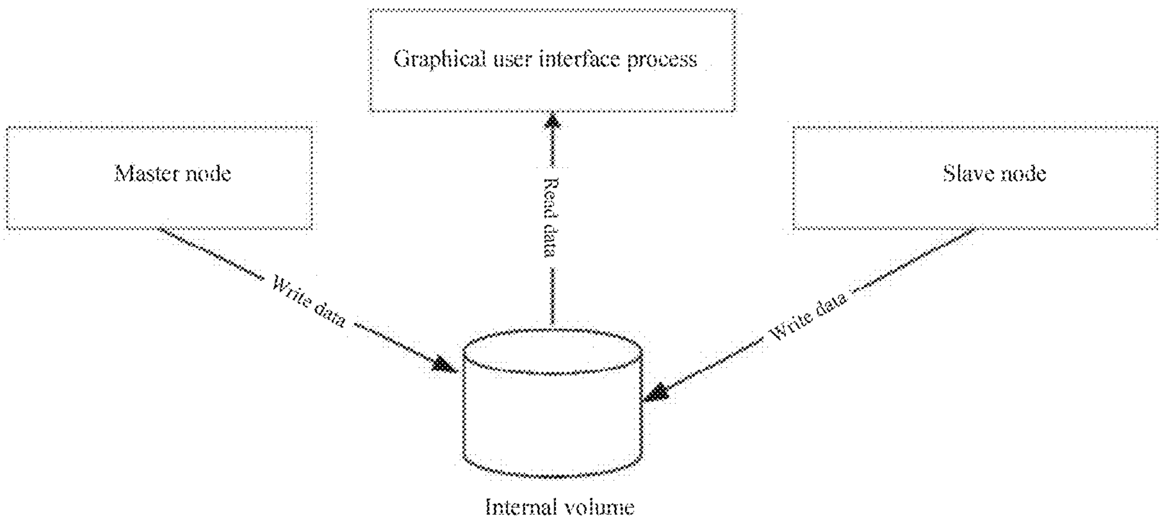
FIG. 2 is a schematic diagram of an internal volume accessible by a node provided by one or more embodiments of the present application.

As shown in FIG. 2, in the embodiment of the present application, in order to solve the occupation of communication bandwidth between the nodes by the performance monitoring data, the internal volume created on the basis of the SCM disk is used to persistently store the performance monitoring data of the master and slave nodes in the storage cluster. After receiving the target query request from the external (such as a user), a graphical user interface (GUI) process in the master node may directly read the performance monitoring data of the node related to the target query request on the internal volume. The read data is subjected to summarized calculation and other processing to obtain the query result, and the query result is displayed externally. Therefore, huge bandwidth consumption generated by the slave node due to the synchronization of performance monitoring data to the master node can be avoided to ensure the performance of the storage cluster.

Considering that the storage cluster may also cause a controller in the storage cluster to send the switching of the master and slave nodes due to software or hardware reasons, that is, a slave node in the storage cluster becomes a new master node. Since the traditional storage cluster synchronizes the performance monitoring data from each slave node to the master node, after the master and slave nodes are switched in the storage cluster, this new master node only has its own performance monitoring data. That is, the new master node needs to re-collect the performance monitoring data of each slave node for summarized calculation, and then store the performance monitoring data subjected to summarized calculation to the local system disk, which will cause the performance monitoring data to be abnormal for a period of time, and the new master node cannot normally process the target query request during data collection.

In this embodiment of the present application, in order to solve the problem that the performance monitoring data needs to be resynchronized after the master and slave nodes are switched. The internal volume created on the basis of the SCM disk is configured to persistently store the performance monitoring data of the master and slave nodes in the storage cluster. After receiving the target query request, the new master node after the master and slave nodes are switched may directly access the internal volume to acquire the performance monitoring data of each slave node in the storage cluster, so as to perform operations such as summarized calculation of the performance monitoring data and return of the query result. Therefore, after the master and slave nodes are switched, the storage cluster does not need to perform the synchronous transmission of the performance monitoring data, and can avoid the situations that the performance monitoring data is abnormal and the target query request cannot be processed normally due to the switching of the master and slave nodes, thereby improving the performance monitoring performance of the storage cluster.

Optionally, in one embodiment, in the above step S101, the accessing the internal volume of the storage cluster and writing its own target data into the internal volume for storage include:

accessing the internal volume of the storage cluster through an interface provided by database software installed on the node, and writing its own target data into a database table corresponding to the node for storage, The internal volume is configured to store the database table corresponding to each node in the storage cluster, and the single database table is configured to store the target data of the single node.

Figure 3:
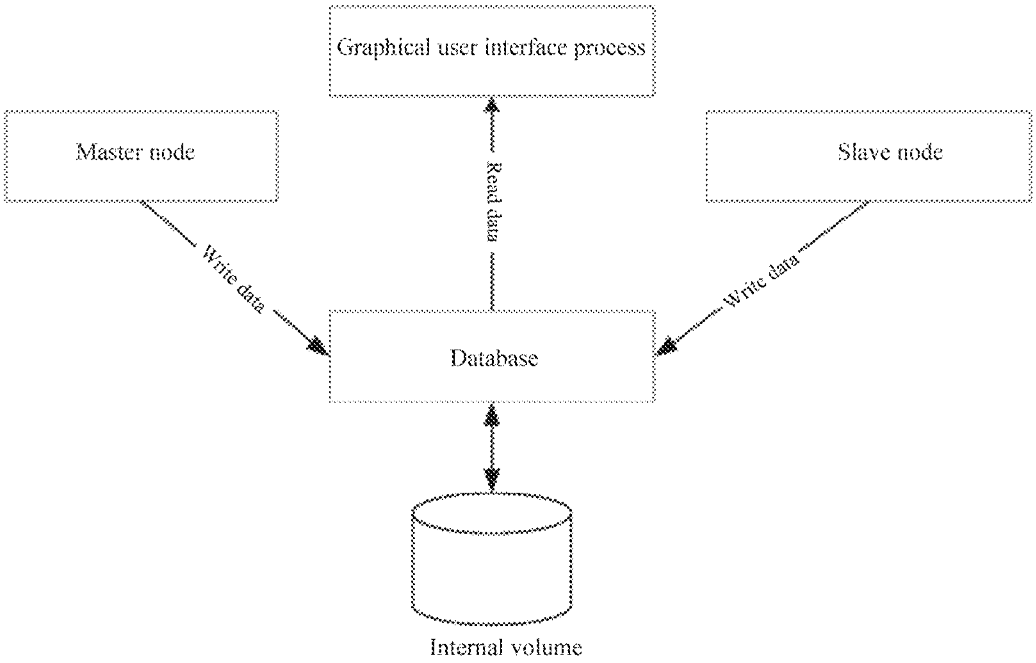
FIG. 3 is a schematic diagram of an internal volume accessible by another node provided by one or more embodiments of the present application.

During specific implementation, considering that it is too cumbersome to organize and manage the target data by nodes, the embodiment of the present application introduces a database technology to organize and manage the target data of each node. As shown in FIG. 3, each node directly writes data to the corresponding data table of each node on the internal volume through the interface provided by the database software. The database (i.e., database software) writes the target data of each node to the internal volume in the form of a database table (which is an object used to store data in the database and is a collection of structured data) corresponding to each node, so as to organize and manage the target data of each node.

As a possible implementation, the method further includes:

installing the database software in a system installation phase of the node, wherein the database software is configured to run an memory database, and the memory database is configured to perform data operation and storage on the target data in the internal volume.

It may be understood that considering that the performance monitoring data of the node needs to be updated and recorded in real time, the waiting time for writing and reading will be too long when the traditional database is used directly, which will have a certain impact on the performance of the storage cluster and lead to poor user experience (e.g., delayed data update on the GUI). Therefore, in the embodiment of the present application, the memory database (eXtremeDB, SolidDB, Oracle TimesTen, Redis and other memory databases) may be selected to organize and manage the performance monitoring data. In addition, the traditional memory database is improved by using the internal volume as a data persistent storage region of the database, whereby this database can perform data operations and persist storage in the SCM disk.

During specific implementation, a database software installation package corresponding to the memory database may be integrated in the system installation file. Each node in the storage cluster installs the memory database during the system installation phase, executes the creation of an internal volume based on the SCM disk according to the configured script, and configures the created internal volume as a persistent storage region for the memory database. Then, each node directly implements data operations such as adding, deleting, modifying and querying and persistent storage of the target data in the internal volume through the interface provided by the memory database installed on this node.

Figure 4:
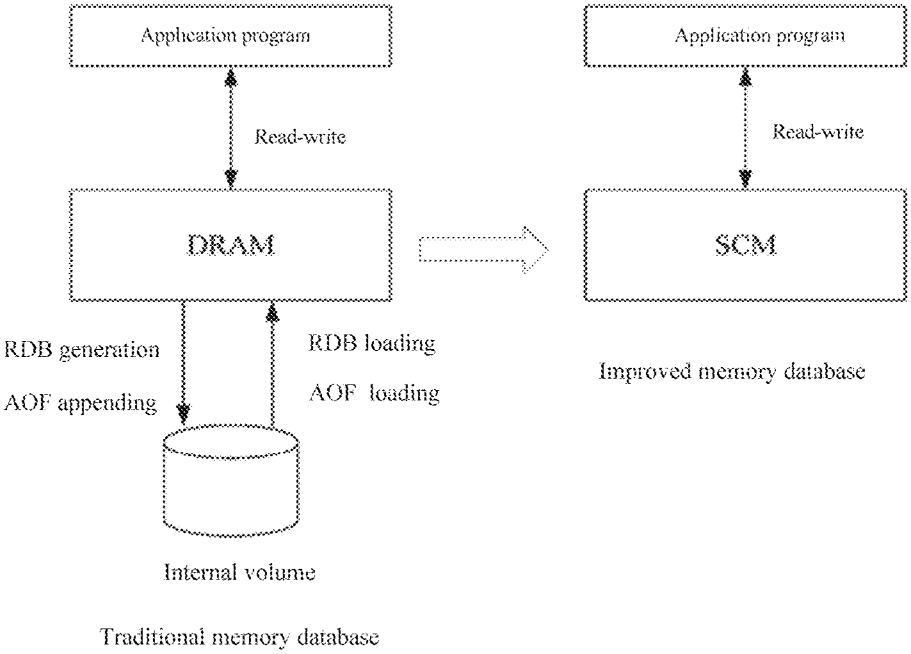
FIG. 4 is a schematic diagram before and after improvement of a memory database provided by one or more embodiments of the present application.

As shown in FIG. 4, the embodiment of the present application breaks through a mode in which data in the traditional memory database such as Redis can only be read and written on volatile storage (such as DRAM). The data in the database may be read and written directly on a high-performance SCM disk (equivalent to using the SCM disk instead of DRAM), and the SCM disk may be configured to directly and persistently store data in the database, instead of persisting the data in the database to a hard disk through RDB or AOF operation, which can improve the storage and access efficiency of the target data.

Optionally, in one embodiment, the creating the internal volume on the basis of the plurality of storage class memory disks configured for the storage cluster includes:

assembling a disk redundant array on the basis of the plurality of storage class memory disks configured for the storage cluster; and creating the internal volume on the basis of the disk redundant array.

Figure 5:
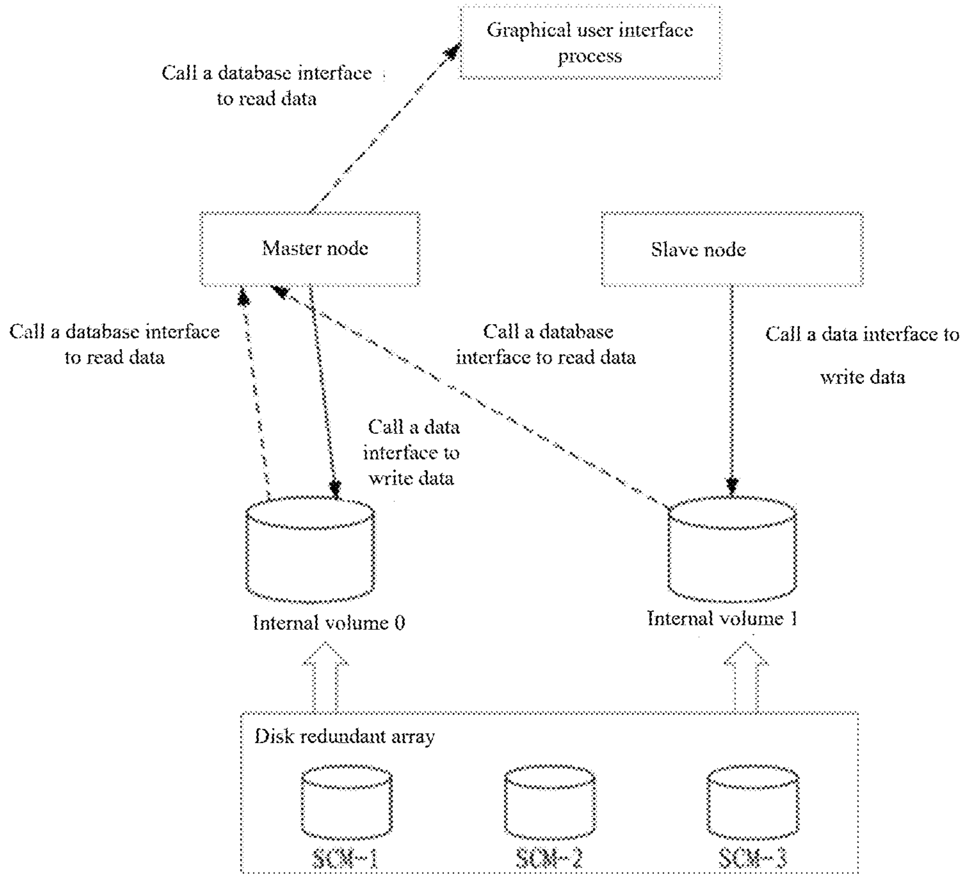
FIG. 5 is a schematic diagram of an internal volume accessible by another node provided by one or more embodiments of the present application.

In this embodiment, as shown in FIG. 5, the respective SCM disks may be assembled as the disk redundant array on the basis of a storage solution such as RAID 5, and then the internal volume may be created on the basis of this disk redundant array. Therefore, the loss of the stored target data due to the damage of the SCM disk and other cases can be avoided, thereby improving the storage security of the target data.

As a possible implementation, the creating the internal volume on the basis of the disk redundant array includes:

creating a single internal volume on the basis of the disk redundant array; and dividing the internal volume into storage partitions corresponding to respective nodes in the storage cluster, wherein one storage partition is configured to store the target data of one node.

This method further includes:

accessing the storage partitions corresponding to other nodes in the storage cluster in a read-only manner.

During specific implementation, a large internal volume may be created on the basis of the disk array or disk redundant array assembled by the SCM disks to store the target data of all nodes in this storage cluster. This internal volume supports parallel access from a plurality of nodes. One node may read and write its own target data from its own corresponding storage partition, and read the target data of other nodes from the corresponding storage partitions of other nodes in a read-only manner, so as to avoid the situation that the data in the corresponding storage partition of the node itself is modified by other nodes, thereby further improving the storage security of the target data.

As another possible implementation, the creating the internal volume on the basis of the disk redundant array includes:

creating the internal volume corresponding to each node in the storage cluster on the basis of the disk redundant array, wherein one internal volume is configured to store the target data of one node.

This method further includes:

accessing the internal volumes corresponding to other nodes in the storage cluster in a read-only manner.

During specific implementation, one internal volume may be created for each node on the basis of the disk array or disk redundant array assembled by the SCM disks to store the target data of each node separately. That is, the created internal columns are created for the same number of nodes. The nodes access their own internal volumes to read and write their own target data, which can improve the parallel performance of multiple nodes accessing the internal volumes. Any node may also access the internal volumes corresponding to other nodes to read the target data of other nodes in a read-only manner, which can avoid bandwidth consumption caused by the transmission of the target data between nodes, and can also avoid the situation that the data in the corresponding internal volume of the node itself is modified by other nodes, thereby further improving the storage security of the target data.

Based on the above embodiment, the present application improves the memory database on the basis of the SCM medium, and organize and manage the target data in the storage cluster by using the improved memory database. Each node writes its target data to the SCM medium for storage through the interface provided by the memory database, which can meet the storage requirement of the node for the target data. In particular, the storage requirement for a large amount of performance monitoring data can further meet the growing needs of users for the number of performance monitoring objects, the number of performance monitoring objects, and the monitoring duration. In addition, since each node can see and access the internal volume assembled on the basis of the SCM medium, after each node writes its own target data to the internal volume, any node may access the performance monitoring data stored in the internal volume by each node through a database interface. Therefore, frequent transfer of the target data between nodes to occupy valuable inter-node bandwidth can be avoided, thereby improving the performance of the storage cluster.

Figure 6:
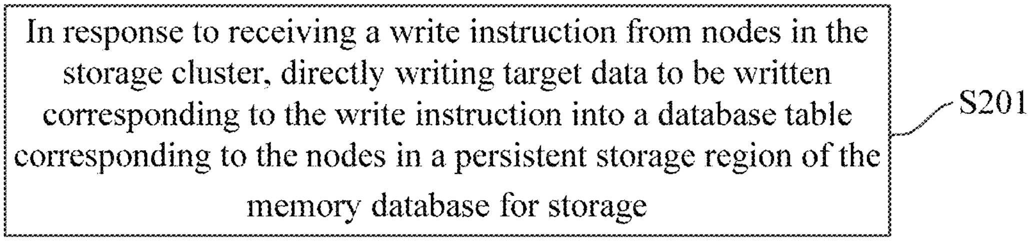
FIG. 6 is an implementation flowchart of another data storage method provided by one or more embodiments of the present application.

In a second aspect, referring to FIG. 6, FIG. 6 is an implementation flowchart of another data storage method provided by an embodiment of the present application. This data storage method is applied to a memory database configured for a storage cluster. The method includes the following step:

step S201: in response to receiving a write instruction from nodes in the storage cluster, directly writing target data to be written corresponding to the write instruction into a database table corresponding to the nodes in a persistent storage region of the memory database for storage.

wherein the persistent storage region of the memory database includes an internal volume of the storage cluster created on the basis of a plurality of storage class memory disks configured for the storage cluster.

The user may configure a plurality of SCM disks for the storage cluster to create the internal volume according to a storage requirement for the current storage cluster, or configure a storage pool containing sufficient SCM disks for the storage cluster in advance. All or some of the SCM disks in the storage pool are selected to create the internal volume to meet different data storage requirements of the storage cluster. After the SCM disks have been configured for the storage cluster, a script may be set such that a target node (e.g., a master node or other specified nodes) in the storage cluster runs this script after the installation to automatically create the internal volume of the storage cluster on the basis of the SCM disks. After the internal volume has been created, each node in the storage cluster may write its own target data to the internal volume for persistent storage through an interface provided by the memory database.

In a possible implementation, the method further includes:

in response to receiving a read instruction from the nodes in the storage cluster, selecting target data to be read corresponding to the read instruction from the memory database; and returning the target data to be read to the nodes.

As a possible implementation, the persistent storage region includes the internal volume corresponding to each node in the storage cluster created on the basis of the plurality of storage class memory disks, wherein one internal volume is configured to store a database table corresponding to one node.

As a possible implementation, the persistent storage region includes a single internal volume created on the basis of the plurality of storage class memory disks, the single internal volume includes storage partitions corresponding to respective nodes in the storage cluster, and one storage partition is configured to store the database table corresponding to one node.

As a possible implementation, the internal volume is created on the basis of the disk redundant array assembled by the plurality of storage class memory disks.

As can be seen from the above technical solutions, considering that the unit cost of the storage class memory disk is much lower than that of the memory, a plurality of storage class memory disks may be configured for the storage cluster; and the internal volume is created for the storage cluster according to the plurality of storage class memory disks to store a large amount of target data of each node instead the memory, and accordingly, the data storage requirement of the nodes can be satisfied and the persistent storage of the target data can be achieved, thereby reducing the loss of the target data.

In a third aspect, an embodiment of the present application further provides a storage cluster. The storage cluster includes a plurality of nodes, wherein:

a target node among the plurality of nodes is configured to create an internal volume of the storage cluster on the basis of a plurality of storage class memory disks configured for the storage cluster; and each of the plurality of nodes is configured to access the internal volume of the storage cluster, and write its own target data into the internal volume for storage.

Optionally, each of the plurality of nodes is further configured to access the internal volume of the storage cluster and read the target data of own and/or other nodes from the internal volume. The target data includes at least one of the metadata and performance monitoring data.

Optionally, the target data includes performance monitoring data, and the plurality of nodes include a master node and at least one slave node, wherein:

the master node or a new master node after the master and slave nodes are switched is configured to, in response to receiving a target query request, read the performance monitoring data from own and the slave node from the internal volume, and determine and return a query result for the target query request according to the read performance monitoring data.

Optionally, the target node is further configured to assemble a disk redundant array on the basis of a plurality of storage class memory disks configured for the storage cluster, and create the internal volume on the basis of the disk redundant array.

Optionally, the target node is further configured to create the internal volume corresponding to each node in the storage cluster on the basis of the disk redundant array, wherein one internal volume is configured to store the target data of one node; and each of the plurality of nodes is further configured to access the internal volumes corresponding to other nodes in the storage cluster in a read-only manner.

Optionally, the target node is further configured to create a single internal volume on the basis of the disk redundant array, and divide the internal volume into storage partitions corresponding to respective nodes in the storage cluster, wherein one storage partition is configured to store the target data of one node; and each of the plurality of nodes is further configured to access the storage partitions corresponding to other nodes in the storage cluster in a read-only manner.

As can be seen from the above technical solutions, considering that the unit cost of the storage class memory disk is much lower than that of the memory, a plurality of storage class memory disks may be configured for the storage cluster; and the internal volume is created for the storage cluster according to the plurality of storage class memory disks to store a large amount of target data of each node instead the memory, and accordingly, the data storage requirement of the nodes can be satisfied and the persistent storage of the target data can be achieved, thereby reducing the loss of the target data.

Figure 7:
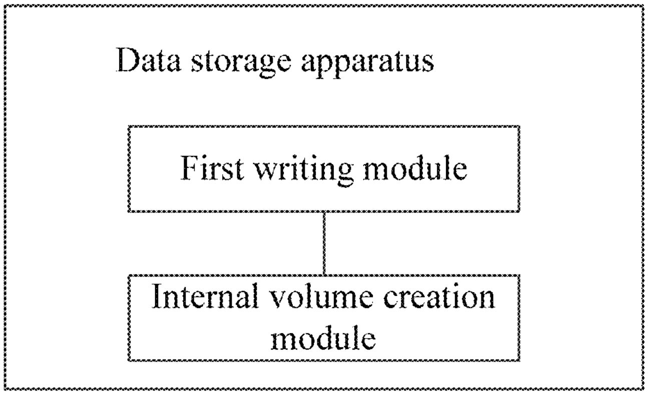
FIG. 7 is a schematic structural diagram of a data storage apparatus provided by one or more embodiments of the present application.

In a fourth aspect, an embodiment of the present application further provides a data storage apparatus, which is applied to any node in a storage cluster. As shown in FIG. 7, the apparatus includes:

a first writing module, configured to access an internal volume of the storage cluster, and write its own target data into the internal volume for storage; and an internal volume creation module, configured to create the internal volume on the basis of a plurality of storage class memory disks configured for the storage cluster, wherein the internal volume is configured to store the target data of each node in the storage cluster.

Optionally, this apparatus further includes:

a first reading module, configured to access the internal volume of the storage cluster and read the target data of one or more nodes in the storage cluster from the internal volume.

Optionally, the target data includes performance monitoring data, and the node is a master node in the storage cluster or a new master node after the master and slave nodes are switched.

The first reading module includes:

a first reading submodule, configured to, in response to receiving a target query request, read the respective performance monitoring data of each node in the storage cluster from the internal volume.

The apparatus further includes:

a result returning module, configured to determine and return a query result for the target query request according to the respective performance monitoring data of each node in the storage cluster.

Optionally, the first writing module includes:

a first writing submodule, configured to access the internal volume of the storage cluster through an interface provided by database software installed on the node, and write its own target data into a database table corresponding to the node for storage, wherein the internal volume is configured to store the database table corresponding to each node in the storage cluster, and the single database table is configured to store the target data of the single node.

Optionally, this apparatus further includes:

a software installation module, configured to install the database software in a system installation phase of the node, wherein the database software is configured to run an memory database, and the memory database is configured to perform data operation and storage on the target data in the internal volume.

Optionally, the internal volume creation module includes:

a first creation submodule, configured to assemble a disk redundant array on the basis of the plurality of storage class memory disks configured for the storage cluster; and a second creation submodule, configured to create the internal volume on the basis of the disk redundant array.

Optionally, the second creation submodule includes:

a third creation submodule, configured to create the internal volume corresponding to each node in the storage cluster on the basis of the disk redundant array, wherein one internal volume is configured to store the target data of one node.

The apparatus further includes:

a first access module, configured to access the internal volumes corresponding to other nodes in the storage cluster in a read-only manner.

Optionally, the second creation submodule includes:

a fourth creation submodule, configured to create a single internal volume on the basis of the disk redundant array; and an area division module, configured to divide the internal volume into storage partitions corresponding to respective nodes in the storage cluster, wherein one storage partition is configured to store the target data of one node.

The apparatus further includes:

a second access module, configured to access the storage partitions corresponding to other nodes in the storage cluster in a read-only manner.

As can be seen from the above technical solutions, considering that the unit cost of the storage class memory disk is much lower than that of the memory, a plurality of storage class memory disks may be configured for the storage cluster; and the internal volume is created for the storage cluster according to the plurality of storage class memory disks to store a large amount of target data of each node instead the memory, and accordingly, the data storage requirement of the nodes can be satisfied and the persistent storage of the target data can be achieved, thereby reducing the loss of the target data.

Figure 8:
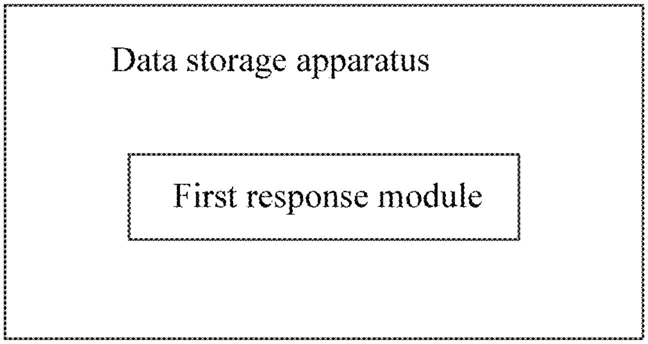
FIG. 8 is a schematic structural diagram of another data storage apparatus provided by one or more embodiments of the present disclosure.

In a fifth aspect, an embodiment of the present application provides another data storage apparatus, which is applied to a memory database configured for a storage cluster. As shown in FIG. 8, this apparatus includes:

a first response module, configured to, in response to receiving a write instruction from nodes in the storage cluster, directly write target data to be written corresponding to the write instruction into a database table corresponding to the nodes in a persistent storage region of the memory database for storage, wherein the persistent storage region of the memory database includes an internal volume of the storage cluster created on the basis of a plurality of storage class memory disks configured for the storage cluster.

Optionally, this apparatus further includes:

a second response module, configured to, in response to receiving a read instruction from the nodes in the storage cluster, select target data to be read corresponding to the read instruction from the memory database; and a first returning module, configured to return the target data to be read to the nodes.

Optionally, the persistent storage region includes the internal volume corresponding to each node in the storage cluster created on the basis of the plurality of storage class memory disks, wherein one internal volume is configured to store the database table of one node.

Optionally, the persistent storage region includes a single internal volume created on the basis of the plurality of storage class memory disks, the single internal volume includes storage partitions corresponding to respective nodes in the storage cluster, and one storage partition is configured to store the database table corresponding to one node.

Optionally, the internal volume is created on the basis of the disk redundant array assembled by the plurality of storage class memory disks.

As can be seen from the above technical solutions, considering that the unit cost of the storage class memory disk is much lower than that of the memory, a plurality of storage class memory disks may be configured for the storage cluster; and the internal volume is created for the storage cluster according to the plurality of storage class memory disks to store a large amount of target data of each node instead the memory, and accordingly, the data storage requirement of the nodes can be satisfied and the persistent storage of the target data can be achieved, thereby reducing the loss of the target data.

It should be noted that, the apparatus embodiment is similar to the method embodiment, so the description is relatively simple. For related parts, please refer to the method embodiment.

Figure 9:
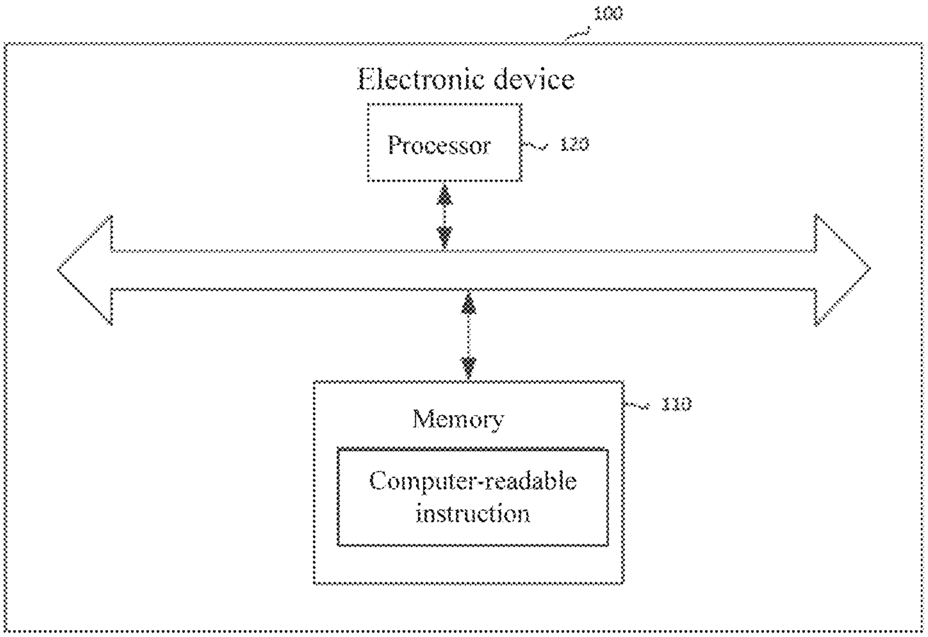
FIG. 9 is a schematic diagram of an electronic device provided by one or more embodiments of the present application.

An embodiment of the present application further provides an electronic device. Referring to FIG. 9, FIG. 9 is a schematic diagram of an electronic device according to an embodiment of the present application. As shown in FIG. 9, the electronic device 100 includes a memory 110 and a processor 120, wherein the memory 110 is in communicated connection with the processor 120 through a bus, a computer-readable instruction is stored in the memory 110, and the computer-readable instruction may be run on the processor 120, so as to implement the steps in the data storage method disclosed in the embodiment of the present application.

Figure 10:
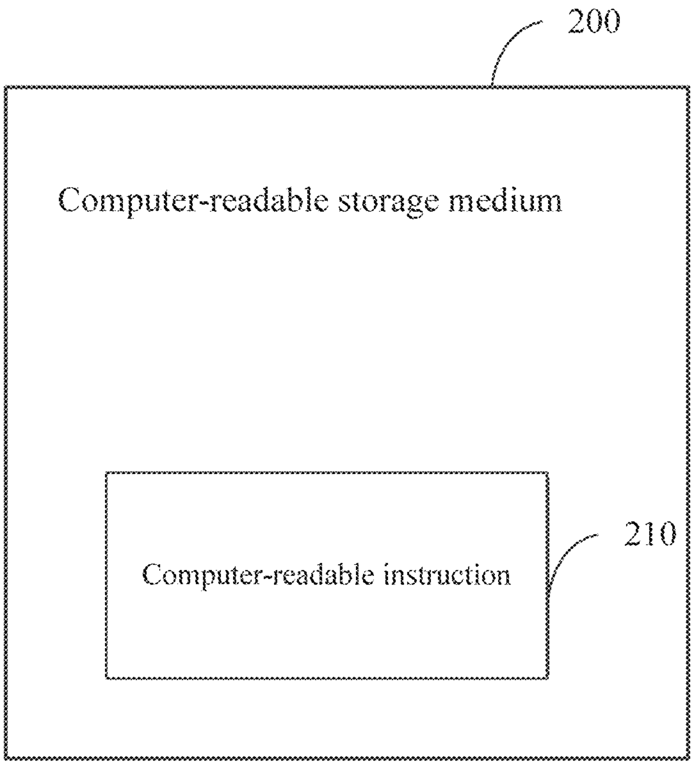
FIG. 10 is a schematic diagram of a computer-readable storage medium provided by one or more embodiments of the present application.

An embodiment of the present application further provides one or more non-volatile computer-readable storage medium having computer-readable instructions stored therein. The computer-readable storage medium refers to FIG. 10. FIG. 10 is a schematic diagram of a computer-readable storage medium provided by an embodiment of the present application. As shown in FIG. 10, the computer-readable storage medium 200 has computer-readable instructions 210 stored therein. The computer-readable instructions 210, when being executed by a processor, implement the steps in the data storage method disclosed in the embodiment of the present application.

An embodiment of the present application further provides a computer-readable instruction product. The computer-readable instruction product includes computer-readable instructions. The computer-readable instructions, when being executed by a processor, implement the steps in the data storage method provided by the embodiment of the present application.

The respective embodiments of the present description are described in a progressive manner, the focus of each embodiment illustrates the differences from other embodiments, and the same or similar parts among the embodiments may refer to one another.

It should be understood by a person skilled in the art, that the embodiments of the present application may be provided as the method, the apparatus or the computer-readable instruction product. Therefore, the present application may adopt embodiments in forms of hardware only, software only, or a combination of software and hardware. Furthermore, the embodiments of the present application may adopt the form of computer-readable instruction product executed on one or more computer usable storage media (including but not being limited to a disk memory, CD-ROM and an optical memory, etc.) containing computer usable program codes.

The embodiments of the present disclosure are described with reference to the flowcharts and/or block diagrams of the method, the system, the device, the storage medium and the computer program product according to the embodiments of the present application. It should be understood that each process and/or block in the flowcharts and/or block diagrams, and combinations of processes and/or blocks in the flowcharts and/or block diagrams, may be realized by computer-readable instructions. These computer-readable instructions may be provided to a generate-purpose computer, a special-purpose computer, an embedded processor, or processors of other programmable data processing terminal devices, to create a machine, such that an apparatus for realizing functions designated in one or more processes in the flowcharts and/or in one or more blocks in the block diagrams, may be created by instructions performed by a computer or processors of other programmable data processing terminal devices.

These computer-readable instructions may further be stored in a computer-readable memory that can guide a computer or other programmable data processing terminal devices to work in a specific way, such that a manufactured product including an instruction apparatus may be created by the instructions stored in this computer-readable storage, and this instruction apparatus realizes the functions designated in one or more processes in the flowcharts and/or in one or more blocks in the block diagrams.

These computer-readable instructions may further be loaded into a computer or other programmable data processing terminal devices, such that a series of operating steps may be performed on the computer or other programmable data processing terminal devices, so as to generate processes realized by the computer, such that steps for realizing the functions designated in one or more processes in the flowcharts and/or in one or more blocks in the block diagrams may be provided by the instructions executed on the computer or other programmable data processing terminal devices.

Although preferred embodiments of the present application have been described, those embodiments may be changed or modified additionally once the basic inventive concepts are known to those skilled in the art. Therefore, the attached claims are intended to be construed to include the preferred embodiments and all changes and modifications that fall within the scope of the embodiments in the present application.

Eventually, it should be also noted that, as used herein, relation terms such as "first" and "second" are used merely to distinguish a subject or an operation from another subject or another operation not to request or imply any substantial relation or order between these subjects or operations. Moreover, terms "include", "contain" or any variation thereof are intended to cover a nonexclusive containing, such that a process, a method, an item or a terminal device containing a series of elements not only includes these elements, but also includes other elements that are not set forth specifically, or also includes an inherent element of such a process, method, item or terminal device. Without further limitation, an element defined by a phrase "include a . . . " does not mean that other same elements are excluded from the process, method, item or terminal device including the element.

The data storage method and apparatus, the device, the medium and the storage cluster provided by the present application are introduced above in detail. Specific examples are used herein to illustrate the principles and embodiments of the present application. The description of the above embodiments is only used to help the understanding of the methods and core ideas of the present application. At the same time, for those skill in the art, according to the ideas of the present application, there will be changes in the specific embodiments and the scope of application. In summary, the content of the present description should not be construed as a limitation of the present application.

What is claimed is:

1. A data storage method, being applied to any node in a storage cluster comprising a master node and at least one slave node, the method comprising:

creating, by the master node, an internal volume on a basis of a plurality of storage class memory disks configured for the storage cluster, wherein the internal volume is configured as a persistent storage region of a memory database operating on the storage cluster;

installing, during a system installation phase of the master node and the at least one slave node, a database software configured to run the memory database;

accessing, through an interface provided by the database software installed respectively on the master node and the at least one slave node, the internal volume in the persistent storage region of the memory database, and writing respective target data of the master node and the at least one slave node into the internal volume for storage;

wherein the target data comprises at least one of metadata or performance monitoring data;

wherein the creating, by the master node, an internal volume on a basis of a plurality of storage class memory disks configured for the storage cluster comprises one of:

assembling a disk redundant array on the basis of the plurality of storage class memory disks configured for the storage cluster; and creating the internal volume corresponding to each of the master node and the at least one slave node in the storage cluster on a basis of the disk redundant array, wherein one internal volume is configured to store the target data of one of the master node and the at least one slave node, wherein the internal volumes corresponding to other nodes in the storage cluster are accessed in a read-only manner; or creating a single internal volume on the basis of the disk redundant array; and dividing the single internal volume into storage partitions corresponding to the master node and the at least one slave node, wherein one storage partition is configured to store the target data of one of the master node and the at least one slave node, wherein the storage partitions corresponding to other nodes in the storage cluster are accessed in the read-only manner;

wherein the master node and the at least one slave node are configured to:

access, in a readable and writable manner, the internal volume or storage partition corresponding to the master node and the at least one slave node; and access, in the read-only manner, the internal volumes or storage partitions corresponding to other nodes;

wherein the method further comprises:

in response to receiving a target query request, accessing, by the master node through the interface provided by the database software installed on the master node and in the read-only manner, the internal volume to acquire performance monitoring data of all nodes in the storage cluster; and determining and returning, by the master node, a query result for the target query request according to the performance monitoring data of all the nodes.

2. The method according to claim 1, further comprising:

accessing the internal volume of the storage cluster, and reading the target data of one or more nodes in the storage cluster from the internal volume.

3. An electronic device, comprising a memory, a processor, and computer-readable instructions that are stored in the memory, wherein the processor is configured to execute the computer-readable instructions to implement the data storage method according to claim 1.

4. One or more non-volatile computer-readable storage media having computer-readable instructions stored therein, wherein the computer-readable instructions, when being executed by one or more processors, cause the one or more processors to perform the data storage method according to claim 1.

5. A data storage method, being applied to a memory database configured for a storage cluster comprising a master node and at least one slave node, an internal volume is created by the master node based on a plurality of storage class memory disks configured for the storage cluster, and the internal volume is configured as a persistent storage region of the memory database; wherein the master node and the at least one slave node are configured to:

access, in a readable and writable manner, the internal volume or storage partition corresponding to the master node and the at least one slave node; and access, in a read-only manner, the internal volumes or storage partitions corresponding to other nodes;

the method comprising:

in response to receiving a write instruction through an interface provided by database software installed on the master node and the at least one slave node in the storage cluster, directly writing target data to be written corresponding to the write instruction into a database table corresponding to the master node and the at least one slave node in the internal volume in the persistent storage region of the memory database for storage;

in response to receiving a target query request, accessing, through the interface provided by the database software installed on the master node and in the read-only manner, the internal volume to acquire performance monitoring data of all nodes in the storage cluster; and determining and returning a query result for the target query request according to the performance monitoring data of all the nodes;

wherein one of:

the internal volume is created by:

assembling a disk redundant array on a basis of the plurality of storage class memory disks configured for the storage cluster; and creating the internal volume corresponding to each of the master node and the at least one slave node in the storage cluster on a basis of the disk redundant array, wherein one internal volume is configured to store the target data of one of the master node and the at least one slave node, wherein the internal volumes corresponding to other nodes in the storage cluster are accessed in the read-only manner; or the internal volume is created by:

creating a single internal volume on the basis of the disk redundant array; and dividing the single internal volume into storage partitions corresponding to the master node and the at least one slave node, wherein one storage partition is configured to store the target data of one of the master node and the at least one slave node, wherein the storage partitions corresponding to other nodes in the storage cluster are accessed in the read-only manner.

6. The method according to claim 5, further comprising:

in response to receiving a read instruction from each of the master node and the at least one slave node in the storage cluster, selecting target data to be read corresponding to the read instruction from the memory database; and returning the target data to be read to each of the master node and the at least one slave node.

7. A storage cluster, comprising a master node and at least one slave node, an internal volume is created by the master node based on a plurality of storage class memory disks configured for the storage cluster, and the internal volume is configured as a persistent storage region of a memory database; wherein:

the master node is configured to create the internal volume of the storage cluster in the persistent storage region of the memory database on a basis of the plurality of storage class memory disks configured for the storage cluster; and the master node and the at least one slave node are configured to:

access, in a readable and writable manner, the internal volume or storage partition corresponding to the master node and the at least one slave node; and access, in a read-only manner, the internal volumes or storage partitions corresponding to other nodes;

the master node or a new master node after the master node and the at least one slave node are configured to:

receive a target query request, accessing, through an interface provided by a database software installed on the master node and in the read-only manner, the internal volume to acquire performance monitoring data of all nodes in the storage cluster; and determine and returning a query result for the target query request according to the performance monitoring data of all the nodes;

wherein one of:

the master node is configured to:

assemble a disk redundant array on the basis of the plurality of storage class memory disks configured for the storage cluster; and create the internal volume corresponding to each of the master node and the at least one slave node in the storage cluster on a basis of the disk redundant array, wherein one internal volume is configured to store the target data of one of the master node and the at least one slave node, wherein the internal volumes corresponding to other nodes in the storage cluster are accessed in the read-only manner; or the master node is configured to:

create a single internal volume on the basis of the disk redundant array; and divide the single internal volume into storage partitions corresponding to respective each of the master node and the at least one slave node in the storage cluster, wherein one storage partition is configured to store the target data of one of the master node and the at least one slave node, wherein the storage partitions corresponding to other nodes in the storage cluster are accessed in the read-only manner.

* * * * *